United States Patent
Pappu et al.

(10) Patent No.: US 10,931,604 B2
(45) Date of Patent: Feb. 23, 2021

(54) COMMENTARY GENERATION

(71) Applicant: Oath Inc., New York, NY (US)

(72) Inventors: Aasish Kumar Pappu, Rego Park, NY (US); Joel Ranjan Tetreault, New York, NY (US)

(73) Assignee: Verizon Media Inc., New York, NY (US)

( * ) Notice: Subject to any disclaimer, the term of this patent is extended or adjusted under 35 U.S.C. 154(b) by 9 days.

(21) Appl. No.: 16/538,150

(22) Filed: Aug. 12, 2019

(65) Prior Publication Data

US 2019/0363998 A1 Nov. 28, 2019

Related U.S. Application Data

(63) Continuation of application No. 15/359,994, filed on Nov. 23, 2016, now Pat. No. 10,382,367.

(51) Int. Cl.
| | |
|---|---|
| *H04L 12/18* | (2006.01) |
| *H04L 12/58* | (2006.01) |
| *G06F 40/35* | (2020.01) |
| *G06F 40/56* | (2020.01) |

(52) U.S. Cl.
CPC .............. *H04L 51/02* (2013.01); *G06F 40/35* (2020.01); *G06F 40/56* (2020.01); *H04L 12/1813* (2013.01); *H04L 12/1822* (2013.01); *H04L 51/04* (2013.01)

(58) Field of Classification Search
None
See application file for complete search history.

(56) References Cited

U.S. PATENT DOCUMENTS

| | | | | |
|---|---|---|---|---|
| 2009/0313274 | A1* | 12/2009 | Chen | H04L 67/306 |
| 2009/0319917 | A1* | 12/2009 | Fuchs | H04M 3/56 |
| | | | | 715/753 |
| 2011/0106895 | A1* | 5/2011 | Ventilla | H04L 12/66 |
| | | | | 709/206 |
| 2012/0304072 | A1* | 11/2012 | Mercuri | G06Q 50/01 |
| | | | | 715/745 |
| 2013/0124192 | A1* | 5/2013 | Lindmark | G06F 40/253 |
| | | | | 704/9 |

(Continued)

*Primary Examiner* — Philip J Chea
*Assistant Examiner* — Hassan A Khan
(74) *Attorney, Agent, or Firm* — Cooper Legal Group, LLC

(57) ABSTRACT

One or more computing devices, systems, and/or methods for commentary generation are provided. For example, a conversation, occurring through a conversation interface associated with a content item, is monitored to identify a tone of the conversation (e.g., users discussing a news article). If the tone deviates from a target tone (e.g., a negative tone of inflammatory comments, a low participation tone, an off topic tone, etc.), then intervention is automatically and programmatically performed for the conversation. For example, subject matter of the content item, information from external sources (e.g., other articles, social network posts, or website content associated with a topic of the news article), and/or programmatically generated information (e.g., topical statements generated by a neural network) are used to construct a comment. The comment is posted to the conversation interface in order to improve the conversation, such as to increase positive engagement by users.

20 Claims, 10 Drawing Sheets

(56) References Cited

U.S. PATENT DOCUMENTS

| | | | |
|---|---|---|---|
| 2014/0082100 A1* | 3/2014 | Sammon | G06Q 10/109 |
| | | | 709/206 |
| 2017/0132207 A1* | 5/2017 | Goldstein | G06F 40/30 |
| 2017/0324868 A1* | 11/2017 | Tamblyn | H04M 3/58 |
| 2018/0219825 A1* | 8/2018 | Nesbitt | G06N 5/02 |
| 2018/0288211 A1* | 10/2018 | Kim | G06F 40/30 |

* cited by examiner

COMMENTARY GENERATION

CROSS REFERENCE TO RELATED APPLICATION

This application claims priority to and is a continuation of U.S. application Ser. No. 15/359,994, filed on Nov. 23, 2016, entitled "COMMENTARY GENERATION", which is incorporated herein.

BACKGROUND

Content, such as a video, a live stream, an e-sporting event, an article, an image, and/or other types of content, may be distributed to multiple users concurrently. For example, thousands of users may watch a live e-sporting event pertaining to a soccer game. Users may desire to share their opinions, thoughts, and/or reactions while viewing the content. In an example, a conversation interface (e.g., instances of user chat interfaces, of a chat room, provided to computing devices of users accessing the content) may be provided to the users while viewing the content. In this way, the users may share messages with one another through the chat room.

Unfortunately, a tone of a conversation within the chat room may become negative (e.g., a user may start to post comments that are inflammatory, derogatory, etc.), off topic, and/or experience times of low participation. If the tone of the conversation becomes negative, off-topic, and/or quiet, then users may leave the chat room and/or come away with a negative experience. Thus, computing resources and/or bandwidth used to host the chat room are wasted. Manual attempts by human moderators to identity undesirable conversations and intervene may be costly and cannot scale to large conversations and/or services that host a large amount of content items for which conversation interfaces are provided (e.g., a news website may provide conversation interfaces for hundreds or thousands of articles).

SUMMARY

In accordance with the present disclosure, one or more computing devices and/or methods for commentary generation are provided. For example, a conversation interface (e.g., instances of chat room interfaces, provided to computing devices of users, hosting a chat room through which users can submit comments as a conversation) may be associated with a content item, such as an article, a video, a live stream, an image, and/or other content that users are accessing. The users can share comments through the conversation interface in order to engage in a conversation relating to the content item. The conversation may be monitored to identify a tone of the conversation based upon comments submitted by users through the conversation interface (e.g., an abusive language detector may be used to detect inflammatory comments indicative of a negative tone for the conversation).

Responsive to determining that the tone deviates from a target tone (e.g., an identification of a threshold number of inflammatory comments, a lack of comments indicating lower user participation, off topic comments, etc.), a subject matter of the content item may be identified. For example, text of a topic (e.g., a title, metadata describing the content item, labels or tags describing the content item, etc.) and/or body of an article (e.g., text of the article, subject matter depicted by an image within the article recognizable by image and feature recognition, etc.) may be evaluated by a subject matter classifier to identify the subject matter (e.g., the article may related to a new strategy videogame).

In one example, a natural language statement may be generated based upon the subject matter. For example, a question may be generated based upon text of the topic and/or the body of the article (e.g., "how do you like the third level of the game?"). In this way, the natural language statement may be posted as a comment through the conversation interface.

In another example, a content source (e.g., a social network, an online encyclopedia, a question and answer service, a blogging website, a forum, etc.) may be queried to identify target content corresponding to the subject matter (e.g., a second article about newly released videogames). A snippet may be extracted from the target content based upon a selection criteria (e.g., a natural language selection criteria, a uniqueness selection criteria, a responsiveness selection criteria, a contextual selection criteria, etc.). In this, way the snippet may be selected as text that reads as a natural language statement, text that is not redundant with other comments of the conversation, text that may improve user engagement with the conversation, and/or text that is contextually relevant to the conversation and/or the content item. A comment may be generated based upon the snippet. The comment may be posted through the conversation interface.

In another example, a comment generator model (e.g., a neural network trained to generate text that is topical for the subject matter) may be used to construct a comment based upon the subject matter. In an example, a matrix of user interests associated with users of the conversation may be used by a factorization machine of the comment generator model to generate the comment that may be interesting and/or relevant to users. The comment may be posted through the conversation interface.

The comment may be tailored as intervention for the conversation in order to help steer the conversation in a more positive, productive, and/or interaction conversation.

DESCRIPTION OF THE DRAWINGS

While the techniques presented herein may be embodied in alternative forms, the particular embodiments illustrated in the drawings are only a few examples that are supplemental of the description provided herein. These embodiments are not to be interpreted in a limiting manner, such as limiting the claims appended hereto.

DETAILED DESCRIPTION

Subject matter will now be described more fully hereinafter with reference to the accompanying drawings, which form a part hereof, and which show, by way of illustration, specific example embodiments. This description is not intended as an extensive or detailed discussion of known concepts. Details that are known generally to those of ordinary skill in the relevant art may have been omitted, or may be handled in summary fashion.

The following subject matter may be embodied in a variety of different forms, such as methods, devices, components, and/or systems. Accordingly, this subject matter is not intended to be construed as limited to any example embodiments set forth herein. Rather, example embodiments are provided merely to be illustrative. Such embodiments may, for example, take the form of hardware, software, firmware or any combination thereof.

1. Computing Scenario

The following provides a discussion of some types of computing scenarios in which the disclosed subject matter may be utilized and/or implemented.

1.1. Networking

Figure 1:
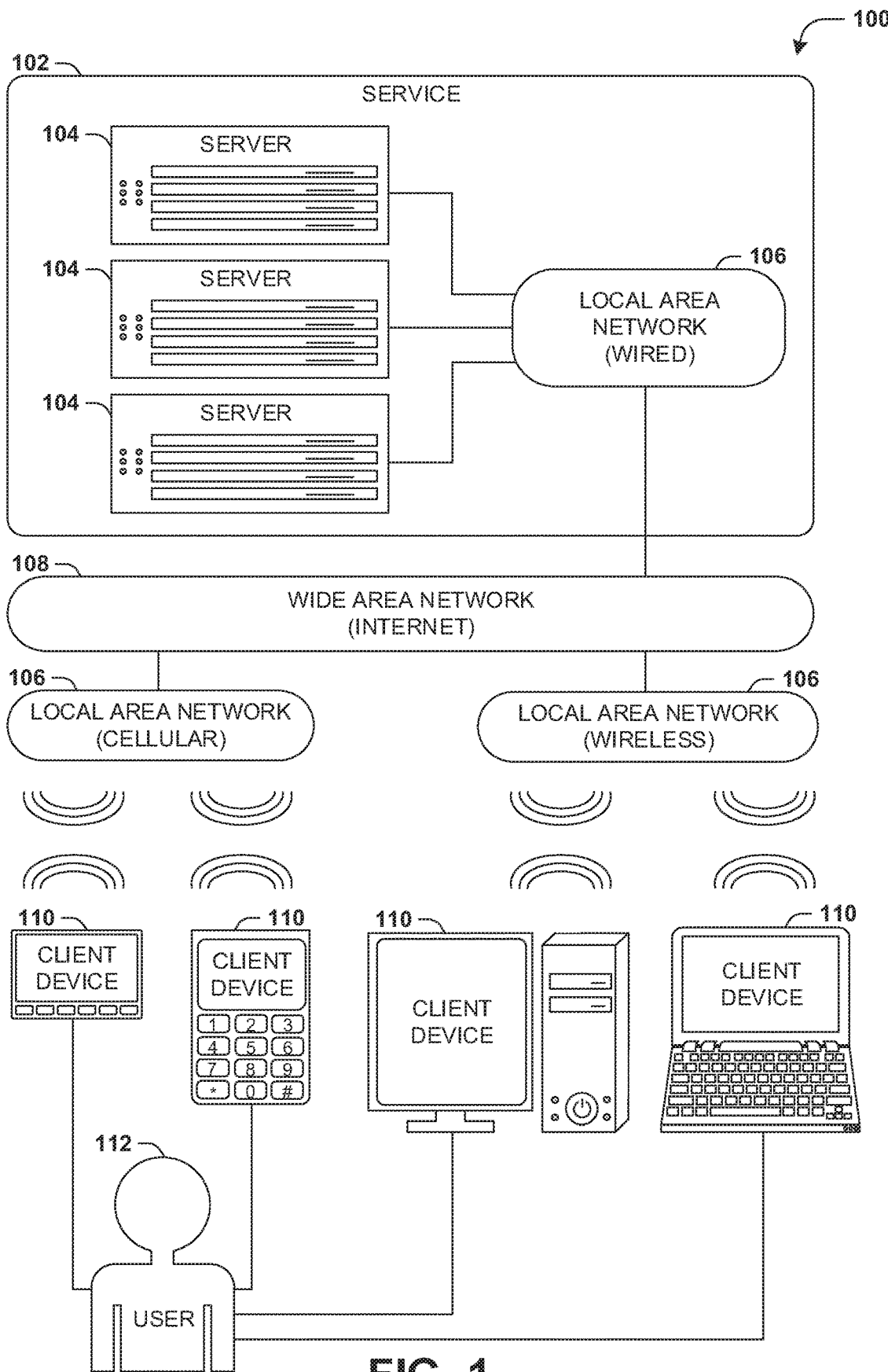
FIG. 1 is an illustration of a scenario involving various examples of networks that may connect servers and clients.

FIG. 1 is an interaction diagram of a scenario 100 illustrating a service 102 provided by a set of servers 104 to a set of client devices 110 via various types of networks. The servers 104 and/or client devices 110 may be capable of transmitting, receiving, processing, and/or storing many types of signals, such as in memory as physical memory states.

The servers 104 of the service 102 may be internally connected via a local area network 106 (LAN), such as a wired network where network adapters on the respective servers 104 are interconnected via cables (e.g., coaxial and/or fiber optic cabling), and may be connected in various topologies (e.g., buses, token rings, meshes, and/or trees). The servers 104 may be interconnected directly, or through one or more other networking devices, such as routers, switches, and/or repeaters. The servers 104 may utilize a variety of physical networking protocols (e.g., Ethernet and/or Fiber Channel) and/or logical networking protocols (e.g., variants of an Internet Protocol (IP), a Transmission Control Protocol (TCP), and/or a User Datagram Protocol (UDP). The local area network 106 may include, e.g., analog telephone lines, such as a twisted wire pair, a coaxial cable, full or fractional digital lines including T1, T2, T3, or T4 type lines, Integrated Services Digital Networks (ISDNs), Digital Subscriber Lines (DSLs), wireless links including satellite links, or other communication links or channels, such as may be known to those skilled in the art. The local area network 106 may be organized according to one or more network architectures, such as server/client, peer-to-peer, and/or mesh architectures, and/or a variety of roles, such as administrative servers, authentication servers, security monitor servers, data stores for objects such as files and databases, business logic servers, time synchronization servers, and/or front-end servers providing a user-facing interface for the service 102.

Likewise, the local area network 106 may comprise one or more sub-networks, such as may employ differing architectures, may be compliant or compatible with differing protocols and/or may interoperate within the local area network 106. Additionally, a variety of local area networks 106 may be interconnected; e.g., a router may provide a link between otherwise separate and independent local area networks 106.

In the scenario 100 of FIG. 1, the local area network 106 of the service 102 is connected to a wide area network 108 (WAN) that allows the service 102 to exchange data with other services 102 and/or client devices 110. The wide area network 108 may encompass various combinations of devices with varying levels of distribution and exposure, such as a public wide-area network (e.g., the Internet) and/or a private network (e.g., a virtual private network (VPN) of a distributed enterprise).

In the scenario 100 of FIG. 1, the service 102 may be accessed via the wide area network 108 by a user 112 of one or more client devices 110, such as a portable media player (e.g., an electronic text reader, an audio device, or a portable gaming, exercise, or navigation device); a portable communication device (e.g., a camera, a phone, a wearable or a text chatting device); a workstation; and/or a laptop form factor computer. The respective client devices 110 may communicate with the service 102 via various connections to the wide area network 108. As a first such example, one or more client devices 110 may comprise a cellular communicator and may communicate with the service 102 by connecting to the wide area network 108 via a wireless local area network 106 provided by a cellular provider. As a second such example, one or more client devices 110 may communicate with the service 102 by connecting to the wide area network 108 via a wireless local area network 106 provided by a location such as the user's home or workplace (e.g., a WiFi (Institute of Electrical and Electronics Engineers (IEEE) Standard 802.11) network or a Bluetooth (IEEE Standard 802.15.1) personal area network). In this manner, the servers 104 and the client devices 110 may communicate over various types of networks. Other types of networks that may be accessed by the servers 104 and/or client devices 110 include mass storage, such as network attached storage (NAS), a storage area network (SAN), or other forms of computer or machine readable media.

1.2. Server Configuration

Figure 2:
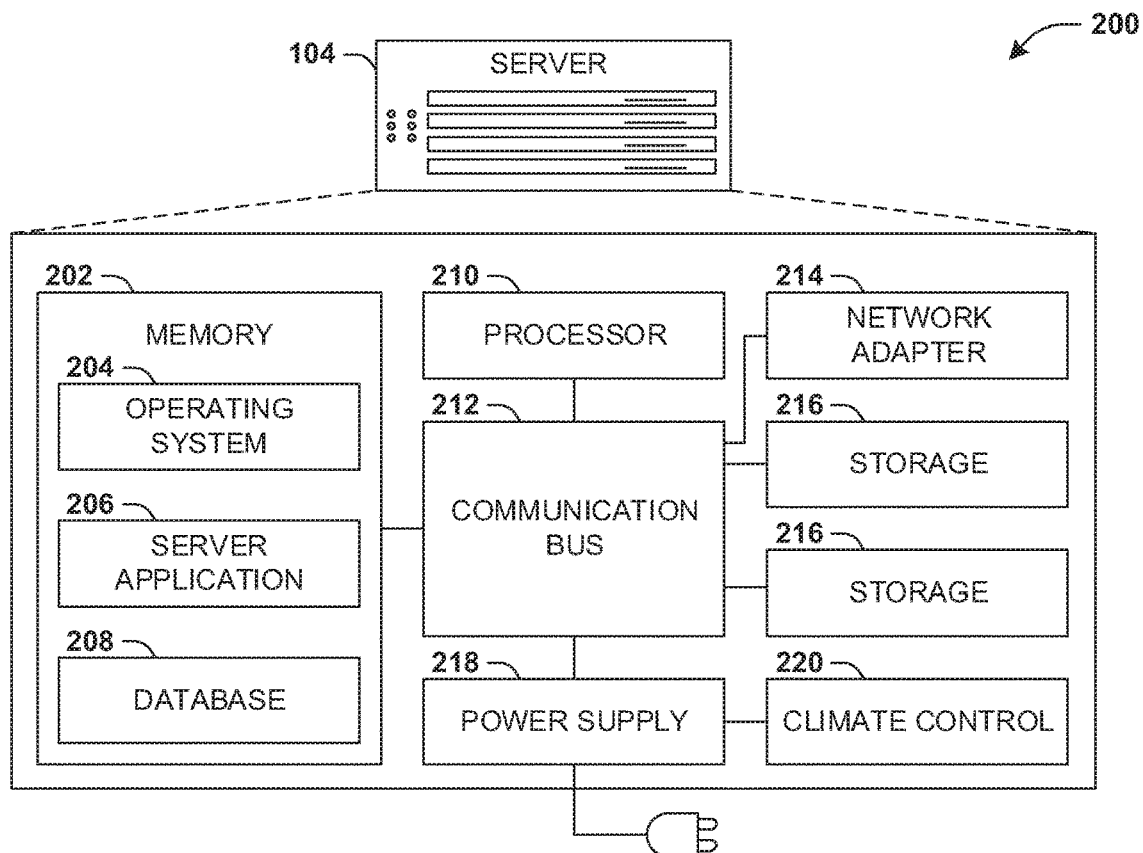
FIG. 2 is an illustration of a scenario involving an example configuration of a server that may utilize and/or implement at least a portion of the techniques presented herein.

FIG. 2 presents a schematic architecture diagram 200 of a server 104 that may utilize at least a portion of the techniques provided herein. Such a server 104 may vary widely in configuration or capabilities, alone or in conjunction with other servers, in order to provide a service such as the service 102.

The server 104 may comprise one or more processors 210 that process instructions. The one or more processors 210 may optionally include a plurality of cores; one or more coprocessors, such as a mathematics coprocessor or an integrated graphical processing unit (GPU); and/or one or more layers of local cache memory. The server 104 may comprise memory 202 storing various forms of applications, such as an operating system 204; one or more server applications 206, such as a hypertext transport protocol (HTTP) server, a file transfer protocol (FTP) server, or a simple mail transport protocol (SMTP) server; and/or various forms of data, such as a database 208 or a file system. The server 104 may comprise a variety of peripheral components, such as a wired and/or wireless network adapter 214 connectible to a local area network and/or wide area network; one or more storage components 216, such as a hard disk drive, a solid-state storage device (SSD), a flash memory device, and/or a magnetic and/or optical disk reader.

The server 104 may comprise a mainboard featuring one or more communication buses 212 that interconnect the processor 210, the memory 202, and various peripherals, using a variety of bus technologies, such as a variant of a serial or parallel AT Attachment (ATA) bus protocol; a Uniform Serial Bus (USB) protocol; and/or Small Computer System Interface (SCI) bus protocol. In a multibus scenario, a communication bus 212 may interconnect the server 104 with at least one other server. Other components that may optionally be included with the server 104 (though not shown in the schematic architecture diagram 200 of FIG. 2) include a display; a display adapter, such as a graphical processing unit (GPU); input peripherals, such as a keyboard and/or mouse; and a flash memory device that may store a basic input/output system (BIOS) routine that facilitates booting the server 104 to a state of readiness.

The server 104 may operate in various physical enclosures, such as a desktop or tower, and/or may be integrated with a display as an "all-in-one" device. The server 104 may be mounted horizontally and/or in a cabinet or rack, and/or may simply comprise an interconnected set of components. The server 104 may comprise a dedicated and/or shared power supply 218 that supplies and/or regulates power for the other components. The server 104 may provide power to and/or receive power from another server and/or other devices. The server 104 may comprise a shared and/or dedicated climate control unit 220 that regulates climate properties, such as temperature, humidity, and/or airflow. Many such servers 104 may be configured and/or adapted to utilize at least a portion of the techniques presented herein.

1.3. Client Device Configuration

Figure 3:
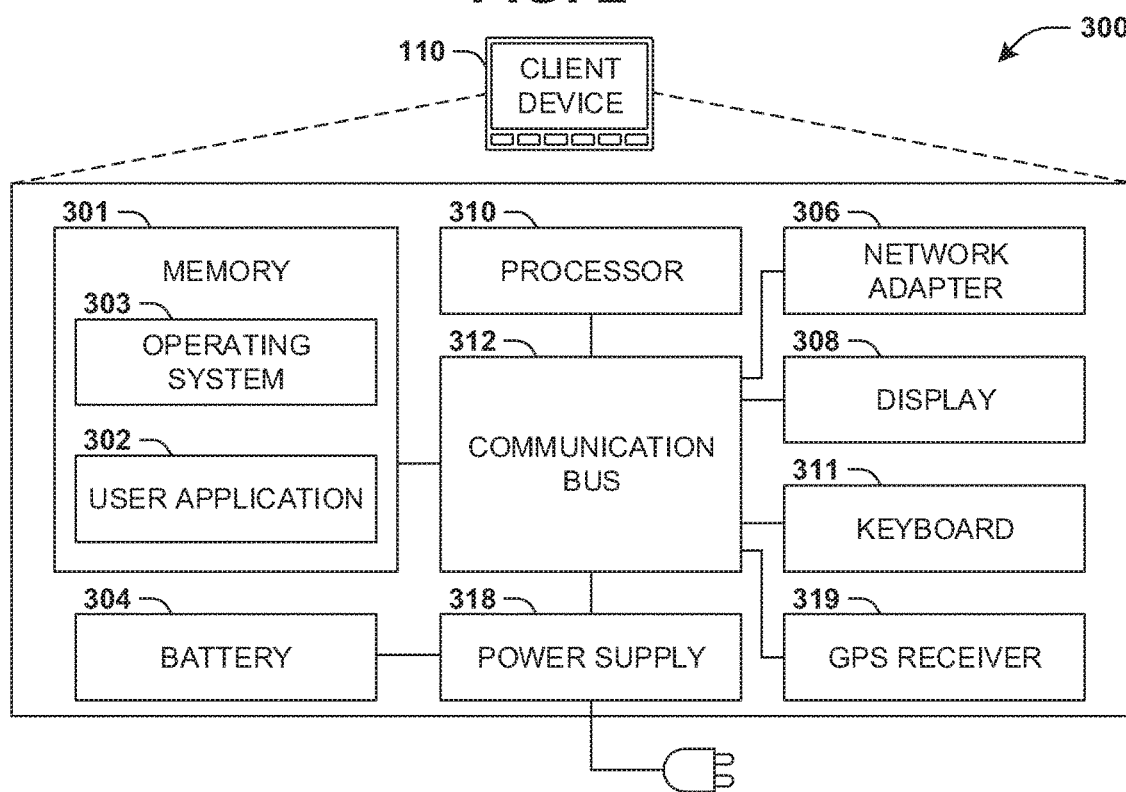
FIG. 3 is an illustration of a scenario involving an example configuration of a client that may utilize and/or implement at least a portion of the techniques presented herein.

FIG. 3 presents a schematic architecture diagram 300 of a client device 110 whereupon at least a portion of the techniques presented herein may be implemented. Such a client device 110 may vary widely in configuration or capabilities, in order to provide a variety of functionality to a user such as the user 112. The client device 110 may be provided in a variety of form factors, such as a desktop or tower workstation; an "all-in-one" device integrated with a display 308; a laptop, tablet, convertible tablet, or palmtop device; a wearable device mountable in a headset, eyeglass, earpiece, and/or wristwatch, and/or integrated with an article of clothing; and/or a component of a piece of furniture, such as a tabletop, and/or of another device, such as a vehicle or residence. The client device 110 may serve the user in a variety of roles, such as a workstation, kiosk, media player, gaming device, and/or appliance.

The client device 110 may comprise one or more processors 310 that process instructions. The one or more processors 310 may optionally include a plurality of cores; one or more coprocessors, such as a mathematics coprocessor or an integrated graphical processing unit (GPU); and/or one or more layers of local cache memory. The client device 110 may comprise memory 301 storing various forms of applications, such as an operating system 303; one or more user applications 302, such as document applications, media applications, file and/or data access applications, communication applications such as web browsers and/or email clients, utilities, and/or games; and/or drivers for various peripherals. The client device 110 may comprise a variety of peripheral components, such as a wired and/or wireless network adapter 306 connectible to a local area network and/or wide area network; one or more output components, such as a display 308 coupled with a display adapter (optionally including a graphical processing unit (GPU)), a sound adapter coupled with a speaker, and/or a printer; input devices for receiving input from the user, such as a keyboard 311, a mouse, a microphone, a camera, and/or a touch-sensitive component of the display 308; and/or environmental sensors, such as a global positioning system (GPS) receiver 319 that detects the location, velocity, and/or acceleration of the client device 110, a compass, accelerometer, and/or gyroscope that detects a physical orientation of the client device 110. Other components that may optionally be included with the client device 110 (though not shown in the schematic architecture diagram 300 of FIG. 3) include one or more storage components, such as a hard disk drive, a solid-state storage device (SSD), a flash memory device, and/or a magnetic and/or optical disk reader; and/or a flash memory device that may store a basic input/output system (BIOS) routine that facilitates booting the client device 110 to a state of readiness; and a climate control unit that regulates climate properties, such as temperature, humidity, and airflow.

The client device 110 may comprise a mainboard featuring one or more communication buses 312 that interconnect the processor 310, the memory 301, and various peripherals, using a variety of bus technologies, such as a variant of a serial or parallel AT Attachment (ATA) bus protocol; the Uniform Serial Bus (USB) protocol; and/or the Small Computer System Interface (SCI) bus protocol. The client device 110 may comprise a dedicated and/or shared power supply 318 that supplies and/or regulates power for other components, and/or a battery 304 that stores power for use while the client device 110 is not connected to a power source via the power supply 318. The client device 110 may provide power to and/or receive power from other client devices.

In some scenarios, as a user 112 interacts with a software application on a client device 110 (e.g., an instant messenger and/or electronic mail application), descriptive content in the form of signals or stored physical states within memory (e.g., an email address, instant messenger identifier, phone number, postal address, message content, date, and/or time) may be identified. Descriptive content may be stored, typically along with contextual content. For example, the source of a phone number (e.g., a communication received from another user via an instant messenger application) may be stored as contextual content associated with the phone number. Contextual content, therefore, may identify circumstances surrounding receipt of a phone number (e.g., the date or time that the phone number was received), and may be associated with descriptive content. Contextual content, may, for example, be used to subsequently search for associated descriptive content. For example, a search for phone numbers received from specific individuals, received via an instant messenger application or at a given date or time, may be initiated. The client device 110 may include one or more servers that may locally serve the client device 110 and/or other client devices of the user 112 and/or other individuals. For example, a locally installed webserver may provide web content in response to locally submitted web requests. Many such client devices 110 may be configured and/or adapted to utilize at least a portion of the techniques presented herein.

2. Presented Techniques

One or more computing devices and/or techniques for commentary generation are provided. For example, users may interact with a conversation interface associated with a content item, such as chat interfaces displayed through computing devices of users watching a political debate. The users may post comments through the conversation interface in order to share their opinions and/or thoughts. Unfortunately, negative, inflammatory, and/or off topic comments may be posted. Such comments and/or low user participation may diminish or ruin the conversation for users. Thus, the users may leave the conversation, and thus computing resources used to host the conversation interface may be wasted. Manually monitoring conversations of conversation interfaces may expend a significant amount of time and computer resources for humans to manually intervene (e.g., each human monitor may require a computing device, computing resources, and/or network bandwidth for manually monitoring conversations). Such manual intervention does not scale for services that host hundreds or thousands of conversations for various content items.

Accordingly, as provided herein, the conversation may be monitored (e.g., by a computer bot) in order to automatically and/or programmatically intervene when a tone of the conversation becomes undesirable, such as where inflammatory and/or negative comments are being posted to the conversation. Various techniques are provided for automatically and/or programmatically generating comments that are used to steer the conversation towards a more desirable tone, such as by posting questions that will increase positive user engagement with the conversation. In this way, comments may be programmatically generated and posted to the conversation in order to improve the conversation without manual intervention that otherwise wastes time and/or computing resources for humans to manually monitor and intervene with conversations.

Figure 4:
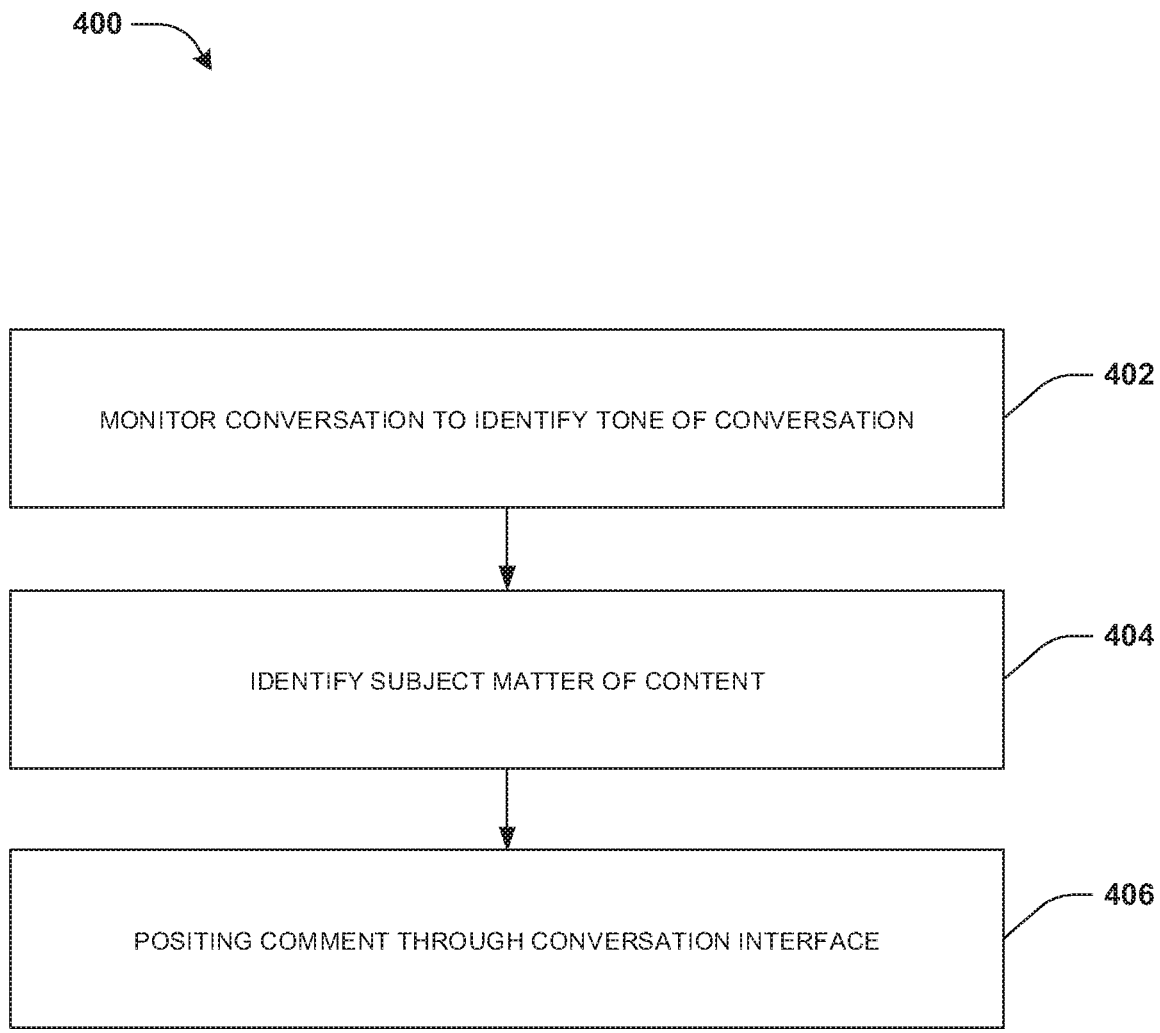
FIG. 4 is a flow chart illustrating an example method for commentary generation.

An embodiment of commentary generation is illustrated by an example method 400 of FIG. 4. A content provider may provide users with access to content items, such as a videogame review article. The content provider or another service may provide users with access to a conversation interface through which users can discuss the videogame review article (e.g., instances of a chat interface may be display through computing devices of users accessing the videogame review article). Unfortunately, a tone of a conversation of the conversation interface may become negative with inflammatory comments (e.g., the use of abusive or inflammatory language), off topic (e.g., two users may start to state their political options), and/or inactive (e.g., a low number of users are submitted comments).

Accordingly, as provided herein, automatic and programmatic computer monitoring of the conversation occurring through the conversation interface may be provided for identifying the tone of the conversation based upon comments submitted by users through the conversation interface, at 402. For example, text, images, icons, emoticons, and/or other user generated content provided through comments may be evaluated (e.g., using text recognition functionality, image recognition functionality, feature recognition functionality, speech recognition functionality, topic classifiers, keyword matching functionality, etc.) to identify a undesirable tone for the conversation based upon a threshold number of comments having inflammatory words, off topic statements, and/or a lack of comments.

The tone may be evaluated to determine whether the tone deviates from a desired target tone. For example, the tone may deviate from the target tone if the tone corresponds to a negative conversation tone, an off topic conversation tone, or a silent conversation tone (e.g., a low participation conversation tone). At 404, responsive to determining that the tone deviates from the desired target tone, a subject matter of the content item may be identified. In an example, a topic (e.g., a header, a title, tagged metadata, user comments, user ratings, etc.) and/or a body (e.g., text and/or images of the videogame review article) may be extracted and evaluated to identify the subject matter of the content item. For example, the subject matter may indicate that the videogame review article corresponds to a race car videogame for a videogame system (X) that has received a rating of 8/10 from a videogame review website. Various subject classifiers, topic classifiers, features classifiers, entity classifiers, and/or other classifiers and/or recognition functionality/algorithms may be used to identify the subject matter.

At 406, a comment may be automatically and programmatically computer generated and posted through the conversation interface as an intervention for the conversation in order to increase user engagement in useful, positive, engaging, and/or interactive ways.

In one embodiment of generating the comment, a natural language statement may be generated based upon the subject matter. Words from the topic and/or the body of the videogame review article may be utilized to generate the comment, such as a question generated formed from the words. For example, a natural language statement generator may utilize the words to construct the natural language statement as the comment (e.g., "I just bought the videogame system (X), when did everyone else buy it?"). In an example, a structured knowledge content source (e.g., a social network, a microblogging service, a forum, an online encyclopedia, a website, etc.) may be searched using the subject matter of the videogame review article to identify structured knowledge (e.g., a release date for the race car videogame) associated with the content item. The natural language statement may be generated to comprise an artificially generated fact derived from the structured knowledge (e.g., "Is anyone else excited about the upcoming release date of this Friday?"). In this way, the natural language statement may be posted as the comment through the conversation interface.

In one embodiment of generating the comment, a content source (e.g., a question and answer website, a social network, a microblogging service, a forum, an online encyclopedia, a website, etc.) may be queried to identify target content corresponding to the subject matter. For example, a second videogame website may be searched to identify a strategy guide article for the race car videogame. A snippet may be extracted from the target content based upon a selection criteria. For example, the snippet may comprise text from the target content such as "Driver (X) is the hardest opponent".

The snippet may be selected based upon various selection criteria. In an example, a natural language selection criteria may be used to assign weights to snippets (e.g., phrases or sentences) within the strategy guide article based upon how much each snippet corresponds to natural language statements (e.g., a snippet "Up, Up, Down, Down, Left, Right, Left, Right, B, A, Start" may be assigned a lower weight because the snippet does not correspond to a natural language statement, whereas the snippet "Driver (X) is the hardest opponent" may be assigned a higher weight because the snippet corresponds more to a natural language statement.

In another example, a uniqueness selection criteria may be used to assign weights to snippets based upon how unique content of each snippet is from comments of the conversation (e.g., recent comments posted within a threshold timespan such as a last 10 minutes of comments). The uniqueness selection criteria is used to avoid the generation of redundant comments that may be less useful in changing the tone of the conversation compared to unique comments. For example, lower weights may be assigned to snippets that have more words matching words of recent comments within the conversation than snippets that do not have words matching the recent comments within the conversation.

In another example, a responsiveness selection criteria may be used to assign weights to snippets based upon determined probabilities that snippets will elicit users to submit reply comments to the snippets (e.g., a probability of reengaging users into the conversation). For example, a snippet "Videogame Company (X) made videogame system (X)" may be assigned a lower weight because less users are likely to respond to such a statement, whereas a snippet "the three best race cars are car (A), car (B), and car (D)" that may be more likely to elicit other users to submit their opinions on which race cars are the best. Various types of classifiers may be used to evaluate and assign weights based upon responsiveness.

In another example, a contextual selection criteria is used to assign weights to snippets based upon contextual relevancy of each snippet to the content item. For example, snippets that have topics and/or words that correlate to the content item (e.g., text of the topic and/or the body of the content item) and/or the subject matter of the content item may be assigned higher weights than snippets that do not have topics and/or words matching such.

In this way, a snippet may be selected based upon the snippet having a desired weight (e.g., a highest weight). A comment may be generated based upon the snippet. In an example, the snippet may be used word for word (e.g., "Driver (X) is the hardest opponent") as the comment. For example, the snippet may be utilized as a quote for the target content. The quote and a citation to the target content may be included within the comment. In another example, the snippet may be modified by adding, removing, or changing words (e.g., "Drive (X) is the hardest opponent, what do you think?").

In one embodiment of generating the comment, a comment generator model may be used to construct the comment, such as a question, based upon the subject matter. In an example, the comment generator model comprises a neural network configured to generate text that is topical for the subject matter of the content item. The neural network may have been trained using training comments that were labeled as positive comments (e.g., comments that received numerous positive user replies, comments that do not comprise inflammatory statements, comments that numerous users liked, comments that led to an interactive discussion that stayed on topic and did not have abusive or inflammatory comments, etc.). For example, a training comment is labeled as the positive comment based upon a threshold number of approval ratings being assigned to the training comment by users (e.g., users "liking" the training comment through a forum, social network, chat interface, blogging service, website, etc.). In an example, the neural network may also be trained to determine how a negative comment is structured so that the neural network can avoid generating negative comments for posting within the conversation interface.

In an example, a context vector may be generated for the content item based upon the subject matter. For example, the context vector may comprise words extracted from the content item (e.g., a vector of the first fifty words occurring within the body of the race car videogame article). The comment generator model may be utilized to construct the comment based upon the context vector, such as by constructing the comment using words within the context vector.

In an example, user signals (e.g., a user profile, social network posts by users, email content of an email account of a user, calendar events of a user calendar, previous comments posted by the user for the conversation or past conversations, browsing history of the user, etc.) may be evaluated to identify user interests of users participating in the conversation. It may be appreciated that users may provide opt-in consent for the use of the user signals, such as for the purpose of comment generation. A matrix of user interests, associated with users of the conversation interface, may be generated. A factorization machine, of the comment generator model, may be used to generate the comment based upon the matrix of user interests. In this way, the comment may be formulated with statements that may be interesting and/or relevant to interests of users of the conversation interface.

In an example, the comment generator model may be utilized to generate the comment based upon content of user comments by users of the conversation interface. For example, the comment may be generated using words of a user comment by a user that has left the conversation interface. In an example, the user may be considered based upon the user having left the conversation over a threshold amount of time from a current time (e.g., users that have left the conversation over 10 minutes prior to the current time). In another example, the user may be considered based upon the user having left the conversation interface and a last comment by the user being posted over a threshold amount of time from a current time. In another example, the user may be considered based upon the user having left the conversation interface and an occurrence of a threshold number of comments being posted since a most recent post by the user (e.g., over 15 comments have occurred since the user left). In this way, users of the conversation interface may not realize that the comment was derived from a prior comment, and thus may be seen as a fresh comment that could elicit user engagement and/or re-engagement.

In an example, a user comment of a user, user identifying information of the user (e.g., the user signals, a user interest derived from the user signals, etc.), and/or co-commentary behavior of users with the user may be utilized to predict a likelihood of the user re-engaging in the conversation based upon a potential comment, generated by the comment generator model, being posted to the conversation interface. For example, a user interest in race car tires and co-commentary behavior indicating that the user is very engaged with other users when discussing types of race car tires may be used to determine that a potential comment about race car tire types available for the race car videogame has a high likelihood of getting the user to re-engage with the conversation. Responsive to the likelihood exceeding a threshold, the potential comment may be posted as the comment within the conversation interface.

Figure 5A:
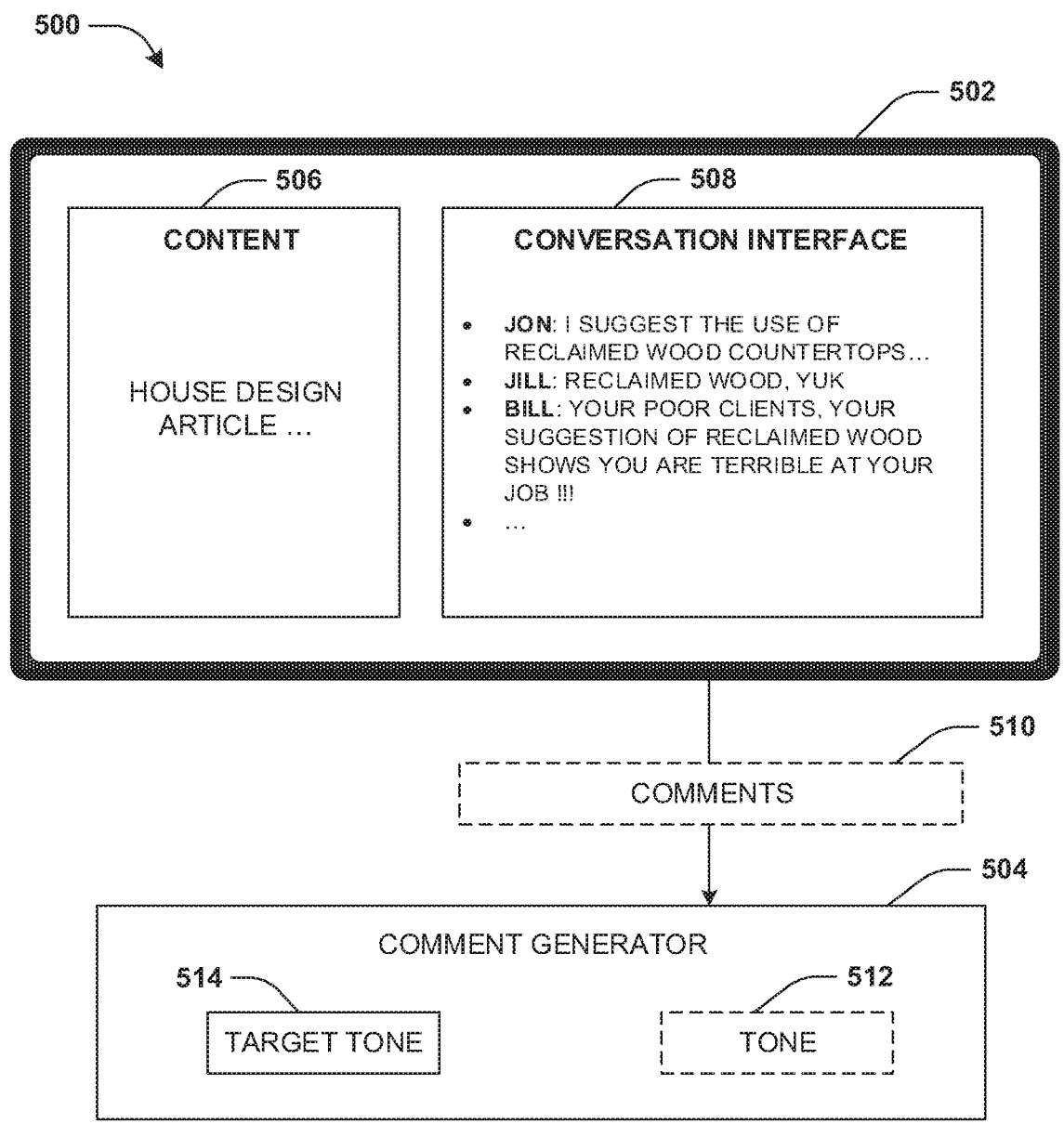
FIG. 5A is a component block diagram illustrating an example system for commentary generation, where a tone of a conversation is identified.
Figure 5B:
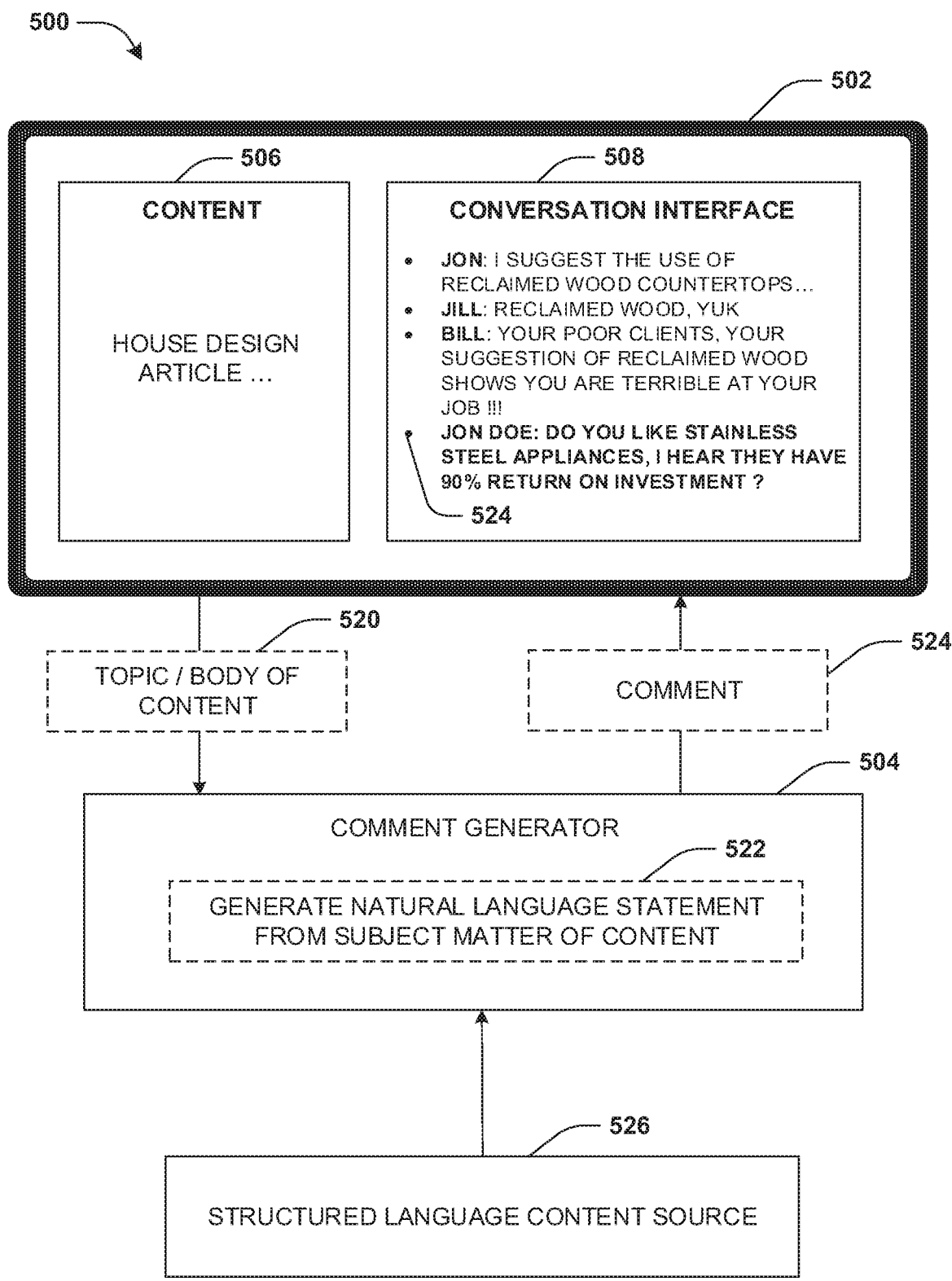
FIG. 5B is a component block diagram illustrating an example system for commentary generation, where a comment is posted to a conversation interface.

FIGS. 5A-5B illustrate examples of a system 500 for commentary generation. FIG. 5A illustrates a user accessing a content item 506 of a house design article using a computing device 502. A conversation interface 508 may be provided for the house design article so that users viewing the house design article can discuss the house design article. A comment generator 504 may be configured to automatically and programmatically monitor a conversation occurring within the conversation interface 508. The comment generator 504 may determine a tone 512 of the conversation based upon comments 510 that are extracted from the conversation interface 508. The comments 510 are evaluated to determine whether the comments 510 comprise negative conversation comments, off topic conversation comments, and/or a lack of comments indicative of a silent or uninteresting conversation. For example, the tone 512 may be indicative of a negative conversation tone that is determined based upon phrases "you are terrible", "yuk", "your poor clients", and/or other inflammatory phrases within the comments 510 of the conversation. The tone 512 of a negative conversation tone may deviate from a target tone 514 (e.g., an on topic tone, a tone of user engagement and discussion, a neutral or positive tone, a non-negative tone, etc.), and thus the comment generator 504 may intervene in the conversation in order to post one or more comments used to change the tone 512 to a more positive and/or interactive tone.

FIG. 5B illustrates the comment generator 504 extracting information 520 such as a topic and/or body of the house design article. The comment generator 504 may determine subject matter of the house design article based upon the information 520. For example, words within the topic and/or the body of the house design article may correspond to stainless steel appliances. The comment generator 504 may generate 522 a natural language statement from the subject matter of the house design article. For example, the natural language statement may comprise a question "do you like stainless steel appliances?". In an example, the comment generator 504 may search a structure language content source 526 to identify structured knowledge associated with the house design article (e.g., a housing economic research article, indicating that stainless steel appliances provide a 90% return on investment, provided by a research website). The natural language statement may be generated 522 to comprise an artificially generated fact from the structured knowledge. For example, "stainless steel appliances provide a 90% return on investment" may be combined with "do you like stainless steel appliances?" to create a comment 524 "do you like stainless steel appliances, I hear they have 90% return on investment?". The comment generator 504 may post the comment 524 through the conversation interface 508.

In an example, the comment 524 may be posted using a predefined name, a randomly generated name, or a determined name. For example, a female or a male name may be chosen based upon a gender composition of users of the conversation interface 508 (e.g., if all users are female and the content item deals with female clothing, then a female name may be chosen for posting the comment 524; if there is a mix of females and males, then a female or male name may be picked to help maintain a gender mix ratio such as a 50/50 ratio). In an example, a name may be determined that is distinct from names of other users of the conversation interface 508.

Figure 6A:
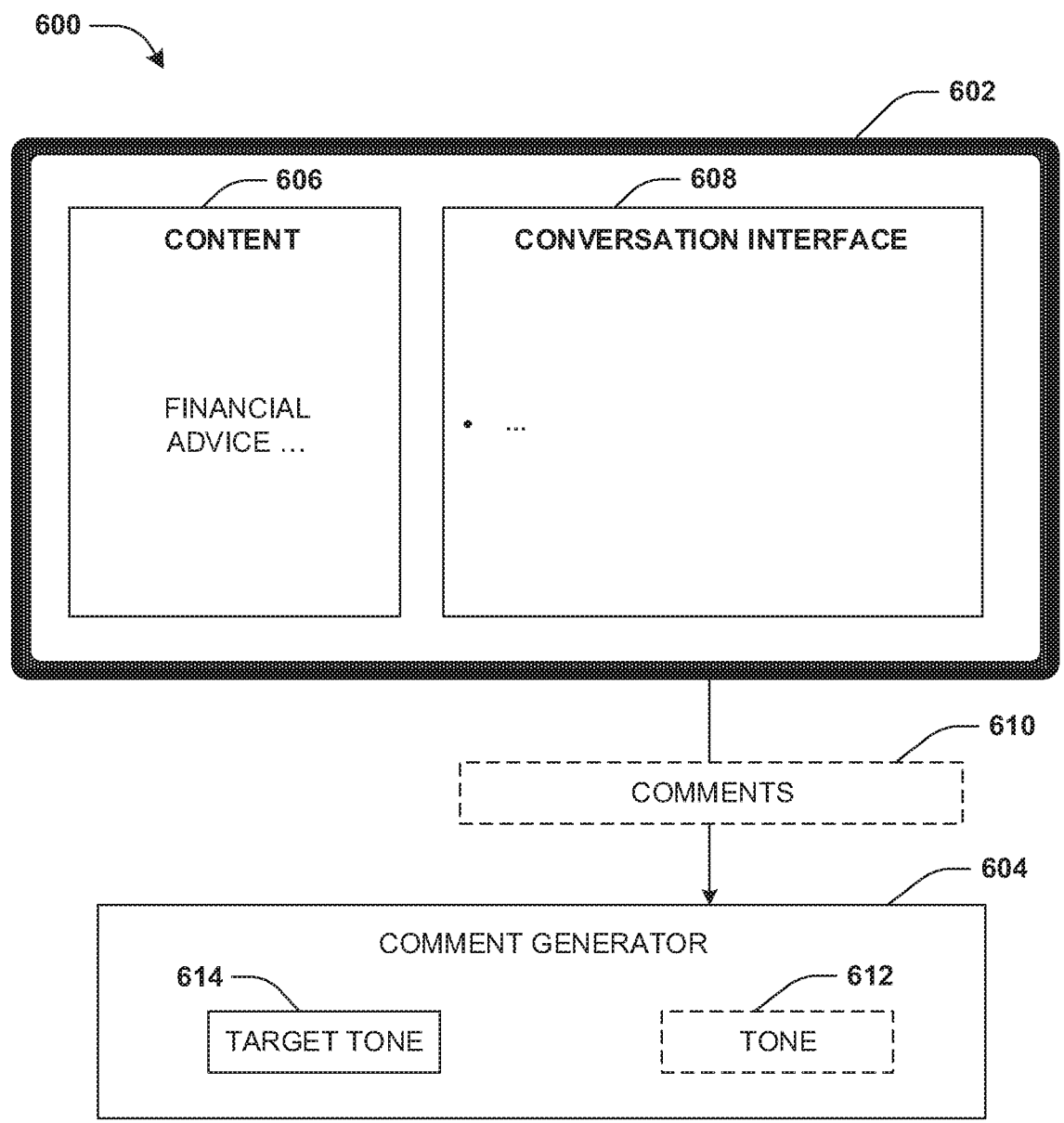
FIG. 6A is a component block diagram illustrating an example system for commentary generation, where a tone of a conversation is identified.
Figure 6B:
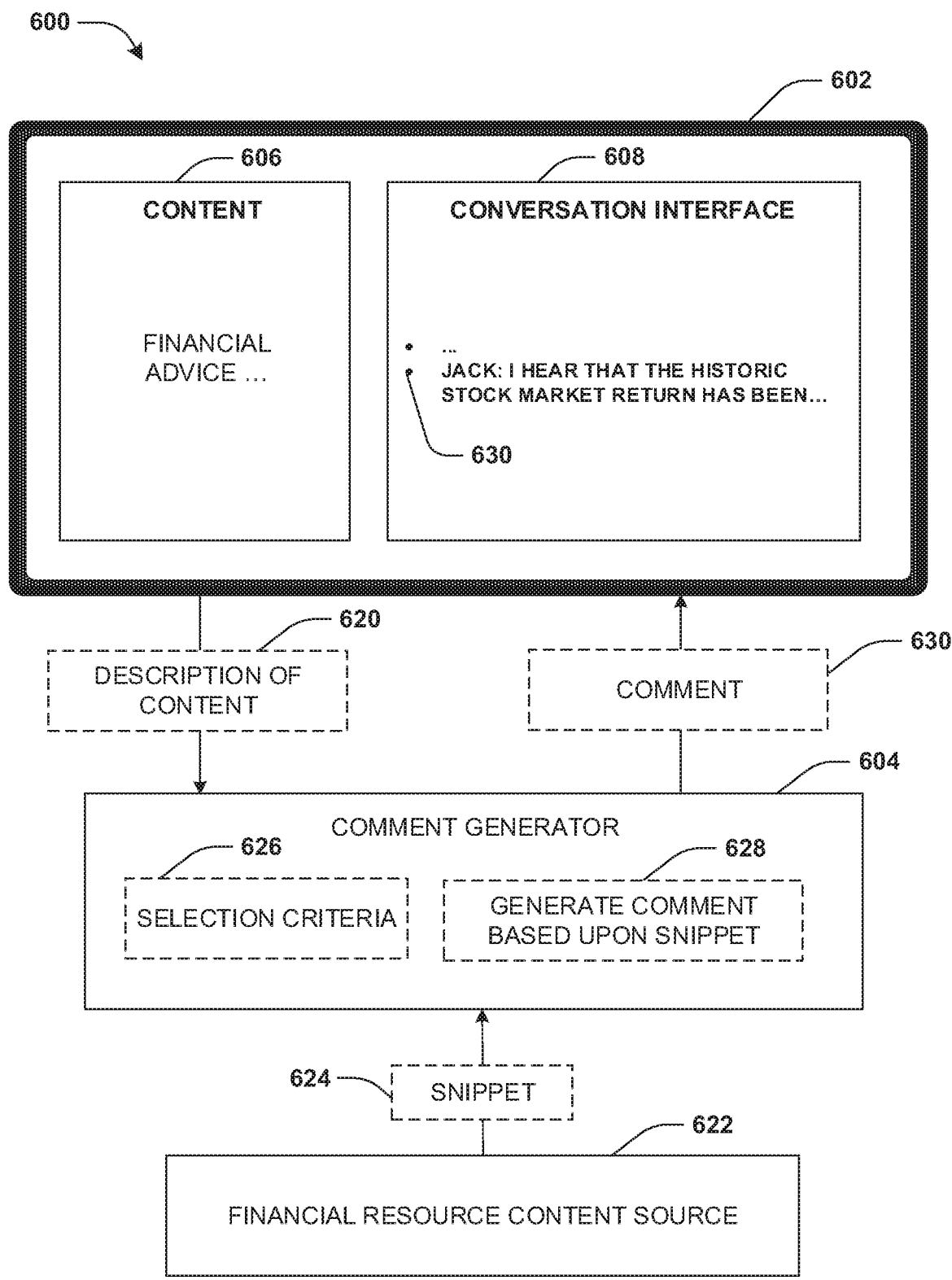
FIG. 6B is a component block diagram illustrating an example system for commentary generation, where a comment is posted to a conversation interface.

FIGS. 6A-6B illustrate examples of a system 600 for commentary generation. FIG. 6A illustrates a user accessing a content item 606 of a financial advice live stream using a computing device 602. A conversation interface 608 may be provided for the financial advice live stream so that users viewing the financial advice live stream can discuss the financial advice live stream. A comment generator 604 may be configured to automatically monitor a conversation occurring within the conversation interface 608. The comment generator 604 may determine a tone 612 of the conversation based upon comments 610 that are extracted from the conversation interface 608. The comments 610 are evaluated to determine whether the comments 610 comprise negative conversation comments, off topic conversation comments, and/or a lack of comments indicative of a silent or uninteresting conversation. For example, the tone 612 may be indicative of a low participation conversation based upon less than a threshold number of comments having been posted through the conversation interface 608 within a threshold timespan (e.g., a last comment may have been posted over 10 minutes ago). The tone 612 of a low participation conversation tone may deviate from a target tone 614 (e.g., an on topic tone, a tone of user engagement and discussion, a neutral or positive tone, a non-negative tone, etc.), and thus the comment generator 604 may intervene in the conversation in order to post one or more comments used to change the tone 612 to a more positive and/or interactive tone.

FIG. 6B illustrates the comment generator 604 extracting information 620 such as a description of the financial advice live stream (e.g., the financial advice live stream may be associated with metadata and/or other text comprising a description of the financial advice live stream). The comment generator 604 may determine subject matter of the financial advice live stream based upon the information 620. For example, words within the description may correspond to stock market investing advice. The comment generator 604 may query a content source, such as a financial resource content source 622, to identify target content corresponding to the subject matter (e.g., forum posts within a stock market history forum).

A snippet 624 (e.g., a statement posted within the stock market history forum) may be extracted from the target content based upon a selection criteria 626. For example, the snippet 624 "historic stock market has a return of 8%" may be selected based upon the snippet 624 being a statement that is contextually relevant to the financial advice live stream, is unique compared to other comments of the conversation, has a higher probability to eliciting user engagement with the conversation, and/or mimics a natural language statement. In this way, a natural language selection criteria, a uniqueness selection criteria, a responsiveness selection criteria, and/or a contextual selection criteria may be used to assign weights to snippets within the stock market history forum so that a snippet having a desired weight (e.g., a highest weight) is selected as the snippet 624.

The comment generator 604 may generate a comment 630 "I hear that the historic stock market return has been 8%, do you think this is true?" based upon the snippet 624 "historic stock market has a return of 8%". For example, the snippet 624 may be modified by the comment generator 604 into a question as the comment 630. The comment generator 624 may post the comment 630 through the conversation interface 608.

Figure 7A:
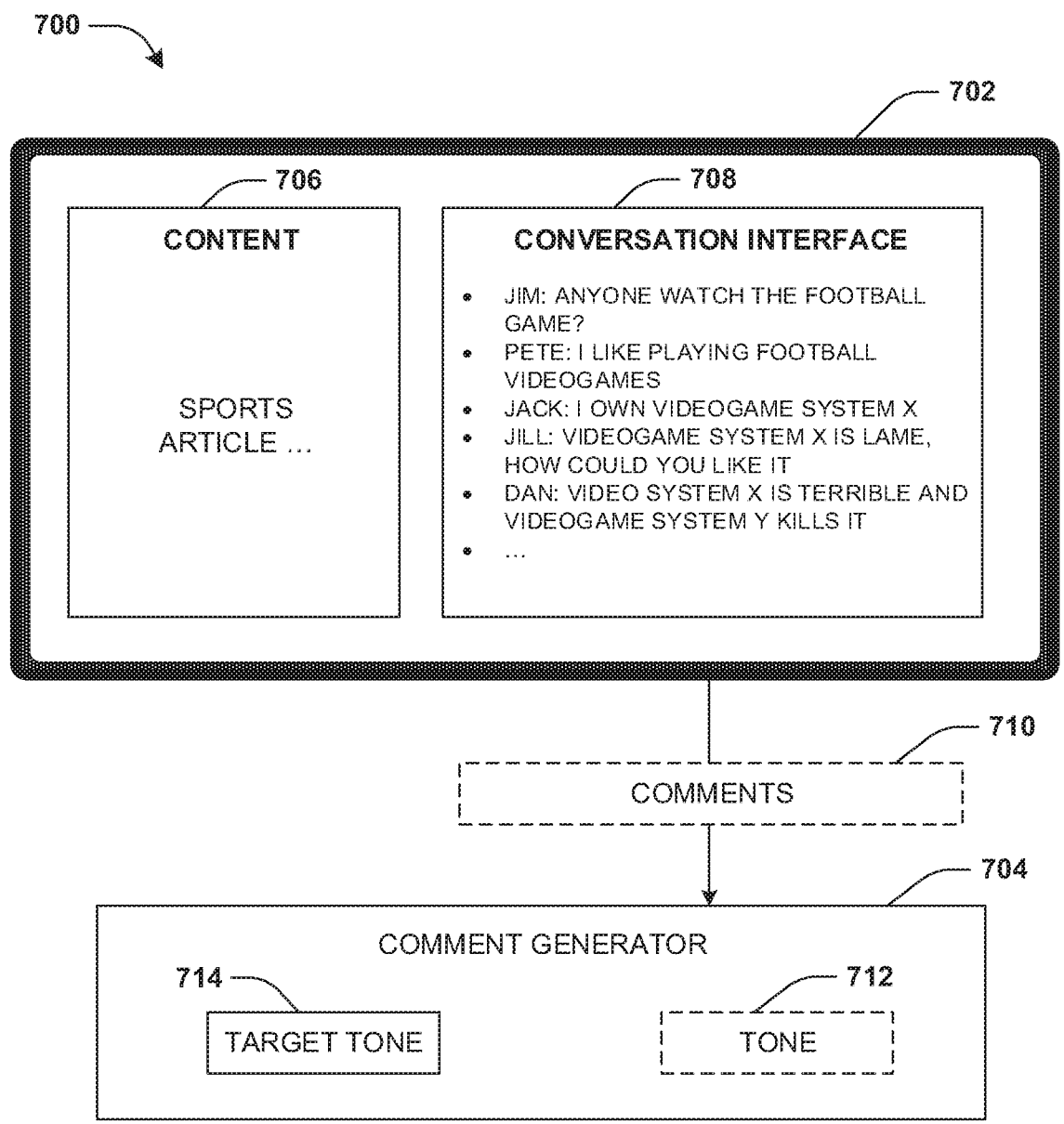
FIG. 7A is a component block diagram illustrating an example system for commentary generation, where a tone of a conversation is identified.
Figure 7B:
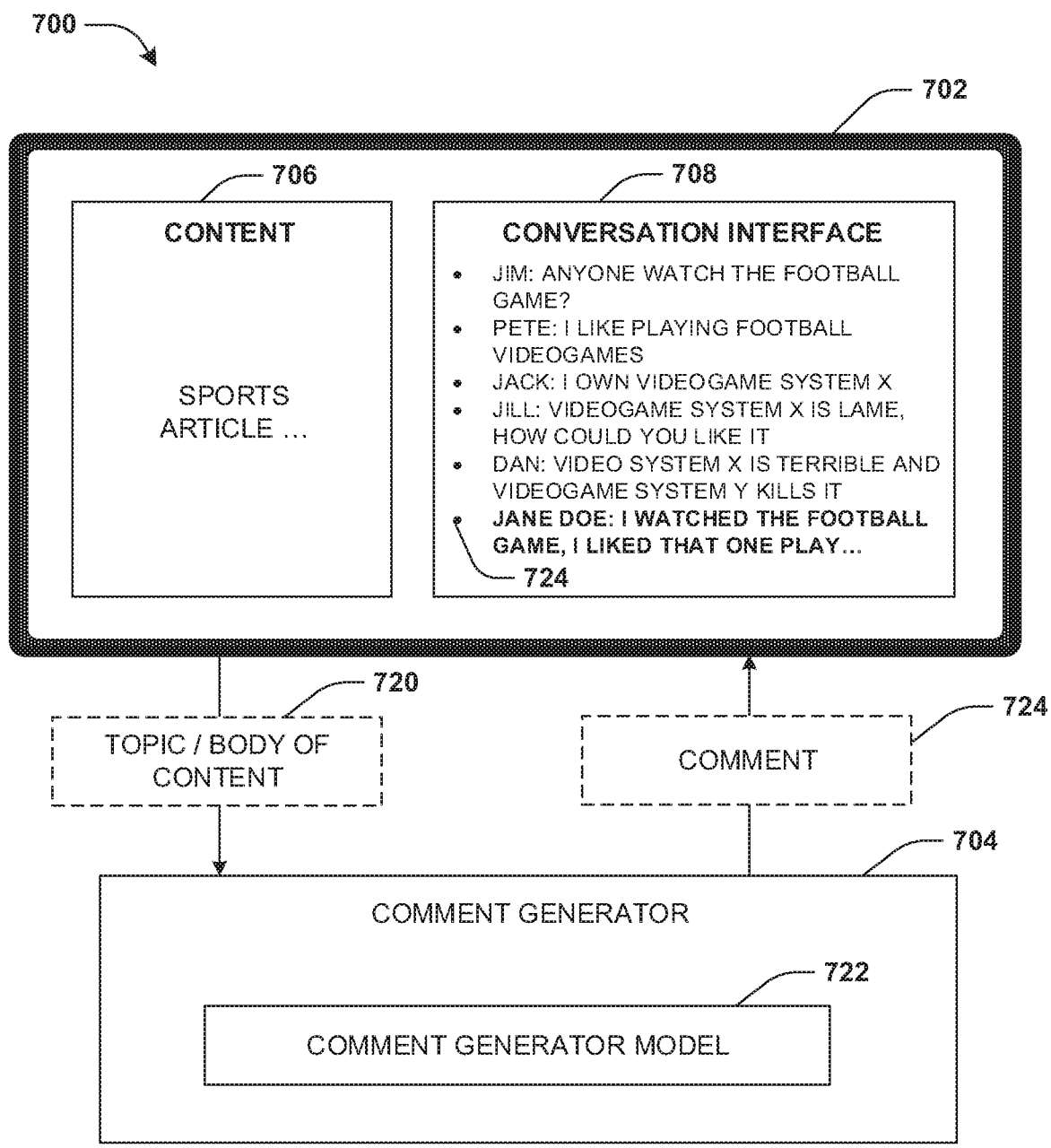
FIG. 7B is a component block diagram illustrating an example system for commentary generation, where a comment is posted to a conversation interface.

FIGS. 7A-7B illustrate examples of a system 700 for commentary generation. FIG. 7A illustrates a user accessing a content item 706 of a sports article using a computing device 702. A conversation interface 708 may be provided for the sports article so that users viewing the sports article can discuss the sports article. A comment generator 704 may be configured to automatically and programmatically monitor a conversation occurring within the conversation interface 708. The comment generator 704 may determine a tone 712 of the conversation based upon comments 710 that are extracted from the conversation interface 708. The comments 710 are evaluated to determine whether the comments 710 comprise negative conversation comments, off topic conversation comments, and/or a lack of comments indicative of a silent or uninteresting conversation. For example, the tone 712 may be indicative of an off topic conversation tone where the conversation went from discussing a football game aspect of the sports article to a negative videogame console war argument that does not relate to the sports article. The tone 712 of the off topic conversation tone may deviate from a target tone 714 (e.g., an on topic tone, a tone of user engagement and discussion, a neutral or positive tone, a non-negative tone, etc.), and thus the comment generator 704 may intervene in the conversation in order to post one or more comments used to change the tone 712 to a more positive and/or on topic tone.

FIG. 7B illustrates the comment generator 704 extracting information 720 such as a topic and/or body of the sports article. The comment generator 704 may determine subject matter of the sports article based upon the information 720. For example, words within the topic and/or the body of the sports article may correspond to a recent football game where football player (X) made an almost impossible touchdown, and thus the subject matter may correspond to the recent football game, the football player (X), and the touchdown play. The comment generator 704 may utilize a comment generator model 722 (e.g., a neural network trained to generate text that is topical for subject matter of content items, such as text that is topical for the recent football game, the football player (X), and/or the touchdown play) to construct a comment 724 based upon the subject matter. For example, the comment 724 "I watched the football game, I liked that one play . . . " may be topical for the recent football game, the football player (X), and/or the touchdown play. The comment generator 704 may post the comment 724 through the conversation interface 708.

Figure 8:
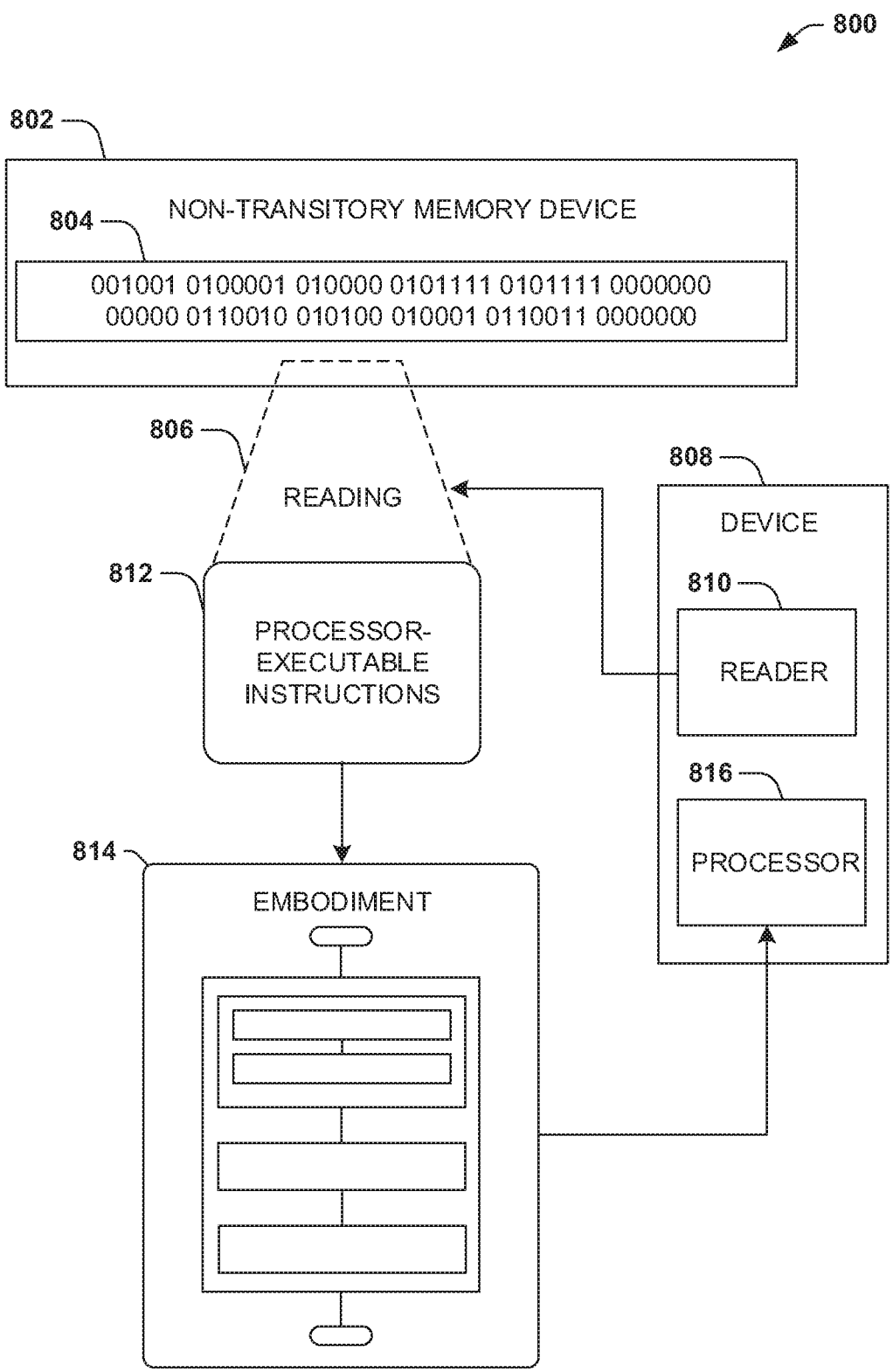
FIG. 8 is an illustration of a scenario featuring an example non-transitory machine readable medium in accordance with one or more of the provisions set forth herein.

FIG. 8 is an illustration of a scenario 800 involving an example non-transitory machine readable medium 802. The non-transitory machine readable medium 802 may comprise processor-executable instructions 812 that when executed by a processor 816 cause performance (e.g., by the processor 816) of at least some of the provisions herein. The non-transitory machine readable medium 802 may comprise a memory semiconductor (e.g., a semiconductor utilizing static random access memory (SRAM), dynamic random access memory (DRAM), and/or synchronous dynamic random access memory (SDRAM) technologies), a platter of a hard disk drive, a flash memory device, or a magnetic or optical disc (such as a compact disk (CD), a digital versatile disk (DVD), or floppy disk). The example non-transitory machine readable medium 802 stores computer-readable data 804 that, when subjected to reading 806 by a reader 810 of a device 808 (e.g., a read head of a hard disk drive, or a read operation invoked on a solid-state storage device), express the processor-executable instructions 812. In some embodiments, the processor-executable instructions 812, when executed cause performance of operations, such as at least some of the example method 400 of FIG. 4, for example. In some embodiments, the processor-executable instructions 812 are configured to cause implementation of a system, such as at least some of the example system 500 of FIGS. 5A-5B, at least some of the example system 600 of FIGS. 6A-6B, and/or at least some of the example system 700 of FIGS. 7A-7B, for example.

3. Usage of Terms

As used in this application, "component," "module," "system", "interface", and/or the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers.

Unless specified otherwise, "first," "second," and/or the like are not intended to imply a temporal aspect, a spatial aspect, an ordering, etc. Rather, such terms are merely used as identifiers, names, etc. for features, elements, items, etc. For example, a first object and a second object generally correspond to object A and object B or two different or two identical objects or the same object.

Moreover, "example" is used herein to mean serving as an example, instance, illustration, etc., and not necessarily as advantageous. As used herein, "or" is intended to mean an inclusive "or" rather than an exclusive "or". In addition, "a" and "an" as used in this application are generally be construed to mean "one or more" unless specified otherwise or clear from context to be directed to a singular form. Also, at least one of A and B and/or the like generally means A or B or both A and B. Furthermore, to the extent that "includes", "having", "has", "with", and/or variants thereof are used in either the detailed description or the claims, such terms are intended to be inclusive in a manner similar to the term "comprising".

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing at least some of the claims.

Furthermore, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, carrier, or media. Of course, many modifications may be made to this configuration without departing from the scope or spirit of the claimed subject matter.

Various operations of embodiments are provided herein. In an embodiment, one or more of the operations described may constitute computer readable instructions stored on one or more computer readable media, which if executed by a computing device, will cause the computing device to perform the operations described. The order in which some or all of the operations are described should not be construed as to imply that these operations are necessarily order dependent. Alternative ordering will be appreciated by one skilled in the art having the benefit of this description. Further, it will be understood that not all operations are necessarily present in each embodiment provided herein. Also, it will be understood that not all operations are necessary in some embodiments.

Also, although the disclosure has been shown and described with respect to one or more implementations, equivalent alterations and modifications will occur to others skilled in the art based upon a reading and understanding of this specification and the annexed drawings. The disclosure includes all such modifications and alterations and is limited only by the scope of the following claims. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure. In addition, while a particular feature of the disclosure may have been disclosed with respect to only one of several implementations, such feature may be combined with one or more other features of the other implementations as may be desired and advantageous for any given or particular application.

What is claimed is:

1. A method of message classification, the method comprising:

executing, on a processor of a computing device, instructions that cause the computing device to perform operations, the operations comprising:

monitoring a conversation occurring through a conversation interface, comprising a chat interface, associated with a content item to identify a tone of the conversation based upon comments submitted by users through the conversation interface, wherein the identifying the tone is based upon at least one of (i) determining a number of comments, of the comments submitted by the users through the conversation interface, that have inflammatory content or (ii) determining a number of the comments submitted by the users through the conversation interface; and responsive to determining that the tone does not correspond to a target tone associated with a threshold and instead deviates from the target tone based upon at least one of (i) a determination that the number of the comments that have inflammatory content exceeds a threshold number of comments or (ii) a determination that the number of the comments submitted by the users through the conversation interface is indicative of a lack of comments:

identifying a subject matter of the content item for which the conversation interface is associated;

generating a natural language statement based upon the subject matter; and posting the natural language statement as a comment through the conversation interface.

2. The method of claim 1, wherein the generating comprises:

utilizing one or more words of a topic of the content item to generate a question as the natural language statement.

3. The method of claim 1, wherein the generating comprises:

utilizing one or more words of a body of the content item to generate a question as the natural language statement.

4. The method of claim 1, wherein the generating comprises:

searching a structured knowledge content source using the subject matter of the content item to identify structured knowledge associated with the content item; and generating the natural language statement to comprise an artificially generated fact derived from the structured knowledge.

5. The method of claim 1, wherein the operations comprise:

determining that the tone deviates from the target tone based upon the tone corresponding to at least one of a negative conversation tone, an off topic conversation tone, or a silent conversation tone.

6. A computing device comprising:

a processor; and memory comprising processor-executable instructions that when executed by the processor cause performance of operations, the operations comprising:

monitoring a conversation occurring through a conversation interface, comprising a chat interface, associated with a content item to identify a tone of the conversation based upon comments submitted by users through the conversation interface, wherein the identifying the tone is based upon determining a number of comments, of the comments submitted by the users through the conversation interface, that have inflammatory content; and responsive to determining that the tone deviates from a target tone associated with a threshold based upon a determination that the number of the comments that have inflammatory content exceeds a threshold number of comments:

identifying a subject matter of the content item for which the conversation is associated;

querying a content source to identify target content corresponding to the subject matter;

extracting a snippet from the target content based upon a selection criteria;

generating a comment based upon the snippet; and posting the comment through the conversation interface.

7. The computing device of claim 6, wherein the generating a comment comprises:

utilizing the snippet as a quote from the target content; and including the quote and a citation to the target content within the comment.

8. The computing device of claim 6, wherein the selection criteria comprises a natural language selection criteria used to assign weights to snippets based upon how much the snippets correspond to natural language statements.

9. The computing device of claim 6, wherein the selection criteria comprises a uniqueness selection criteria used to assign weights to snippets based upon how unique content of the snippets is from comments of the conversation.

10. The computing device of claim 6, wherein the selection criteria comprises a responsiveness selection criteria used to assign weights to snippets based upon probabilities that snippets will elicit users to submit reply comments to the snippets.

11. The computing device of claim 6, wherein the selection criteria comprises a contextual selection criteria used to assign weights to snippets based upon contextual relevancy of the snippets to the content item.

12. A non-transitory machine readable medium having stored thereon processor-executable instructions that when executed cause performance of operations, the operations comprising:

monitoring a conversation occurring through a conversation interface, comprising a chat interface, associated with a content item to identify a tone of conversation-based comments submitted by users through the conversation interface, wherein the identifying the tone is based upon determining a number of comments submitted by the users through the conversation interface; and responsive to determining that the tone deviates from a target tone associated with a threshold based upon a determination that the number of the comments submitted by the users through the conversation interface is indicative of a lack of comments:
- identifying a subject matter of the content item for which the conversation interface is associated;
- utilizing a comment generator model to construct a comment based upon the subject matter; and
- posting the comment through the conversation interface.

13. The non-transitory machine readable medium of claim 12, wherein the comment generator model comprises a neural network configured to generate text that is topical for the subject matter.

14. The non-transitory machine readable medium of claim 13, wherein the operations comprise:
- training the neural network based upon comments that are labeled as positive comments.

15. The non-transitory machine readable medium of claim 14, wherein the operations comprise:
- labeling a training comment as a positive comment based upon a threshold number of approval ratings being assigned to the training comment by users.

16. The non-transitory machine readable medium of claim 12, wherein the operations comprise:
- generating a context vector for the content item based upon the subject matter, wherein the context vector comprises words extracted from the content item; and
- utilizing the comment generator model to construct the comment based upon the context vector.

17. The non-transitory machine readable medium of claim 12, wherein the operations comprise:
- utilizing the comment generator model to construct a question as the comment.

18. The non-transitory machine readable medium of claim 12, wherein the operations comprise:
- generating a matrix of user interests associated with users of the conversation interface; and
- utilizing a factorization machine, of the comment generator model, to generate the comment based upon the matrix of user interests.

19. The non-transitory machine readable medium of claim 12, wherein the operations comprise:
- utilizing the comment generator model to generate the comment based upon content of a user comment by a user that has left the conversation interface.

20. The non-transitory machine readable medium of claim 12, wherein the operations comprise:
- utilizing a user comment of a user, user identifying information of the user, and co-commentary behavior of users with the user to predict a likelihood of the user re-engaging in the conversation based upon a potential comment generated by the comment generator model; and
- responsive to the likelihood exceeding a threshold, posting the potential comment as the comment within the conversation interface.

* * * * *